(12) United States Patent
Bocker et al.

(10) Patent No.: US 9,073,245 B2
(45) Date of Patent: Jul. 7, 2015

(54) RECEPTACLE MANUFACTURING

(75) Inventors: Albert J. Bocker, Ettlingen (DE);
Andreas W. Dobmaier, Karlsruhe (DE);
Alex Ehler, Rastatt (DE); Patrick Gmünd, Karlsruhe (DE); Peter Grauer, Steinweiler (DE); Moez Haouala, Mothern (FR); Matthias B. Olbrich, Trimbach (FR); Pierre E. Delbarre, Plano, TX (US)

(73) Assignee: TI Automotive Technology Center GmbH, Rastatt (DE)

( * ) Notice: Subject to any disclaimer, the term of this patent is extended or adjusted under 35 U.S.C. 154(b) by 807 days.

(21) Appl. No.: 12/491,964

(22) Filed: Jun. 25, 2009

(65) Prior Publication Data

US 2009/0324866 A1    Dec. 31, 2009

(30) Foreign Application Priority Data

Jun. 30, 2008 (DE) .......................... 10 2008 030 318

(51) Int. Cl.
*B29C 49/20* (2006.01)
*B29C 49/42* (2006.01)
(Continued)

(52) U.S. Cl.
CPC ............ *B29C 49/20* (2013.01); *B29C 49/4247* (2013.01); *B29C 47/0066* (2013.01); *B29C 66/54* (2013.01); *B29C 49/2408* (2013.01); *B29C 49/50* (2013.01); *B29C 51/267* (2013.01); *B29C 65/028* (2013.01); *B60K 15/03177* (2013.01); *B29C 49/04* (2013.01); *B29C 49/22* (2013.01); *B29C 2049/2008* (2013.01); *B29C 2791/001* (2013.01); *B29C 2791/006* (2013.01); *B29C 2791/007* (2013.01); *B29C 2793/00* (2013.01); *B29L 2031/7172* (2013.01); *B29K 2995/0082* (2013.01); *B29K 2995/0067* (2013.01); *B29L 2009/005* (2013.01); *B29C 47/0026* (2013.01); *B29C 47/003* (2013.01); *B29C 47/0054* (2013.01); *B29C 47/0057* (2013.01); *B29C 47/065* (2013.01); *B29C 49/16* (2013.01); *B29C 49/18* (2013.01);
(Continued)

(58) Field of Classification Search
None
See application file for complete search history.

(56) References Cited

U.S. PATENT DOCUMENTS 4,952,347 A    8/1990  Kasugai
5,554,422 A    9/1996  Gill et al.
(Continued)

FOREIGN PATENT DOCUMENTS

DE    10231866 A1    1/2004
DE    102006031902 A1    1/2008
(Continued)

OTHER PUBLICATIONS

European Search Report, Jun. 21, 2010 (7 pages).
(Continued)

*Primary Examiner* — Benjamin Schiffman
(74) *Attorney, Agent, or Firm* — Reising Ethington P.C.

(57) ABSTRACT

A method of manufacturing a product, including extruding a parison, and separating the parison into parison halves by cutting a partially expanded parison or by pulling apart a longitudinally weakened parison, and forming the parison halves against corresponding mold halves. The method may also include applying a film against the parison halves and/or the mold halves, and forming the film and parison halves against the mold halves to produce multi-layer product halves. Apparatuses for performing the method are also disclosed.

10 Claims, 12 Drawing Sheets

(51) Int. Cl.
  *B29C 47/00* (2006.01)
  *B29C 65/00* (2006.01)
  *B29C 49/24* (2006.01)
  *B29C 49/50* (2006.01)
  *B29C 51/26* (2006.01)
  *B29C 65/02* (2006.01)
  *B60K 15/03* (2006.01)
  *B29C 49/04* (2006.01)
  *B29C 49/22* (2006.01)
  *B29L 31/00* (2006.01)
  *B29L 9/00* (2006.01)
  *B29C 47/06* (2006.01)
  *B29C 49/16* (2006.01)
  *B29C 49/18* (2006.01)
  *B29C 49/48* (2006.01)
  *B29C 51/10* (2006.01)
  *B29C 51/12* (2006.01)
  *B29C 51/14* (2006.01)
  *B29C 51/16* (2006.01)
  *B29L 7/00* (2006.01)
  *B29C 49/02* (2006.01)
  *B29C 49/62* (2006.01)

(52) U.S. Cl.
  CPC ........ *B29C 49/4242* (2013.01); *B29C 49/4817* (2013.01); *B29C 51/10* (2013.01); *B29C 51/12* (2013.01); *B29C 51/14* (2013.01); *B29C 51/162* (2013.01); *B29C 51/165* (2013.01); *B29C 51/167* (2013.01); *B29L 2007/007* (2013.01); *B29C 2049/026* (2013.01); *B29C 2049/027* (2013.01); *B29C 2049/2073* (2013.01); *B29C 2049/2402* (2013.01); *B29C 2049/2404* (2013.01); *B29C 2049/2429* (2013.01); *B29C 2049/2449* (2013.01); *B29C 2049/2454* (2013.01); *B29C 2049/2472* (2013.01); *B29C 2049/4841* (2013.01); *B29C 2049/622* (2013.01); *B29C 2049/625* (2013.01); *B29C 2793/0063* (2013.01); *B60K 2015/03032* (2013.01); *B29L 2009/001* (2013.01)

(56) References Cited

U.S. PATENT DOCUMENTS

| 5,589,241 | A | 12/1996 | Stiles et al. |
| 5,885,515 | A | 3/1999 | Hudkins |
| 6,033,749 | A | 3/2000 | Hata et al. |
| 6,440,353 | B1 | 8/2002 | Hutchins |
| 6,485,668 | B1 | 11/2002 | Murphy et al. |
| 6,712,234 | B2 | 3/2004 | Boecker |
| 6,808,673 | B2 | 10/2004 | Van Schaftingen |
| 6,866,812 | B2 | 3/2005 | Van Schaftingen et al. |
| 6,893,603 | B2 | 5/2005 | Rohde et al. |
| 6,916,442 | B2 | 7/2005 | Dupont et al. |
| 6,969,246 | B1 | 11/2005 | Kundinger et al. |
| 7,097,445 | B2 | 8/2006 | Brandner et al. |
| 7,387,699 | B2 | 6/2008 | Ideno et al. |
| 7,837,927 | B2 | 11/2010 | Morel et al. |
| 2002/0105115 | A1 | 8/2002 | Sadr |
| 2002/0110658 | A1 | 8/2002 | Lucke et al. |
| 2003/0164572 | A1* | 9/2003 | Pappert et al. ................. 264/150 |
| 2003/0198768 | A1 | 10/2003 | Delbarre |
| 2005/0040566 | A1 | 2/2005 | Knueppel et al. |
| 2005/0040567 | A1 | 2/2005 | Knueppel et al. |
| 2005/0104260 | A1 | 5/2005 | Van Schaftingen et al. |
| 2006/0141184 | A1* | 6/2006 | Rohde et al. ................. 428/35.7 |
| 2008/0038497 | A1 | 2/2008 | Nemoto |

FOREIGN PATENT DOCUMENTS

| EP | 0087828 A1 | 9/1983 |
| EP | 1334817 A1 | 8/2003 |
| EP | 1759827 A1 | 3/2007 |
| EP | 2141000 A2 | 6/2010 |
| FR | 2853276 A1 | 10/2004 |
| JP | 2006103116 | 4/2006 |
| WO | WO0015418 A1 | 3/2000 |
| WO | WO2004007182 A1 | 1/2004 |

OTHER PUBLICATIONS

Written Opinion & International Search Report for PCT/US10/3914, mailed Feb. 11, 2011, 6 pages.
Ito H, et al. Blow Mould Method Hollow Product Die Close Shape Correspond; WPI/Thomson XP-002578460; Apr. 27, 2010; 1 page.
Extended European Search Report for EP Application No. 14156234.8 dated May 16, 2014 (13 pages).
Extended European Search Report for EP Application No. 14156232.2 dated May 21, 2014 (10 pages).

* cited by examiner

RECEPTACLE MANUFACTURING

CROSS-REFERENCE TO RELATED APPLICATION

Applicants claim priority of German Application, Ser. No. 10 2008 030 318.6, filed Jun. 30, 2008, which is incorporated herein by reference in its entirety.

TECHNICAL FIELD

The present disclosure relates generally to a method of manufacturing a plastic receptacle and, more particularly, to a plastic product molding process.

BACKGROUND

Blow molding is a well-known method for producing a variety of plastic products, particularly receptacles or hollow vessels including fuel tanks, containers, and the like. In general, a typical process of blow molding a multiple layer fuel tank involves extruding a multilayer tubular parison into an open mold and around spreader pins and a blow pin. The spreader pins expand to stretch the hot parison in a radial direction toward mold halves. The mold halves close together around the stretched parison and the blow pin injects pressurized gas into the interior of the parison to displace the parison into conformity with interior surfaces of the mold halves. Also, a carrier and various fuel system components, such as fuel level sensors, venting devices, fuel pumps, fuel filters, and the like may be carried by the blow pin and molded in place. But placement of the components in the tank during blow molding can be difficult, because the components attach to the inside surface of the molded fuel tank only after the mold has been closed and the parison shaped against the mold halves.

Also, fuel tanks are often produced by blow molding an extruded multiple layer parison that may include multiple structural, barrier, and adhesive layers. But extrusion typically requires dedicated extrusion equipment that produces fixed quantities of parison layers of fixed size and fixed configuration. Accordingly, there is limited flexibility in producing fuel tanks of variable quantity, size, and configuration of layers.

SUMMARY

In one implementation of a presently preferred method of manufacturing a product, a parison is extruded and positioned in a mold having mold halves, and upper and lower portions of the parison are collapsed to define a sealed interior of the parison. Furthermore, the mold is partially closed to leave gaps between the mold halves, and pressurized gas is introduced into the sealed interior of the parison to partially expand the parison. Also, the partially expanded parison is cut into halves along the gaps between the mold halves.

According to another implementation, a method of manufacturing a product includes extruding a parison to include longitudinally extending weakened portions, gripping the parison with opposed grippers on opposed sides of the weakened portions, and retracting the opposed grippers to tear the parison apart to define parison halves.

According to a further implementation, a method of manufacturing a product includes extruding a parison, separating the parison into halves, and positioning the parison halves between mold halves of a mold. The method also includes applying a film against at least one of the parison halves or the mold halves, and forming the film and parison halves against the mold halves to produce multi-layer fuel tank halves.

According to an additional implementation, an apparatus for manufacturing a product includes an extruder to extrude a parison, a mold having mold halves, and pincers to collapse upper and lower portions of the parison to define a sealed interior of the parison. The apparatus also includes grippers to position the parison in the mold, wherein the mold is partially closed to leave gaps between the mold halves, and pressurized gas is introduced into the sealed interior of the parison to inflate the parison. The apparatus further includes cutters to cut the inflated parison into halves along the gaps between the mold halves.

According to yet another implementation, an apparatus for manufacturing a product includes an extruder to extrude a parison to include longitudinally weakened portions, and opposed grippers advanced to grip the parison on opposed sides of the weakened portions, and retracted to tear the parison apart to define parison halves.

BRIEF DESCRIPTION OF THE DRAWINGS

The following detailed description of exemplary embodiments and best mode will be set forth with reference to the accompanying drawings, in which.

DETAILED DESCRIPTION OF PREFERRED EMBODIMENTS

Figure 1:
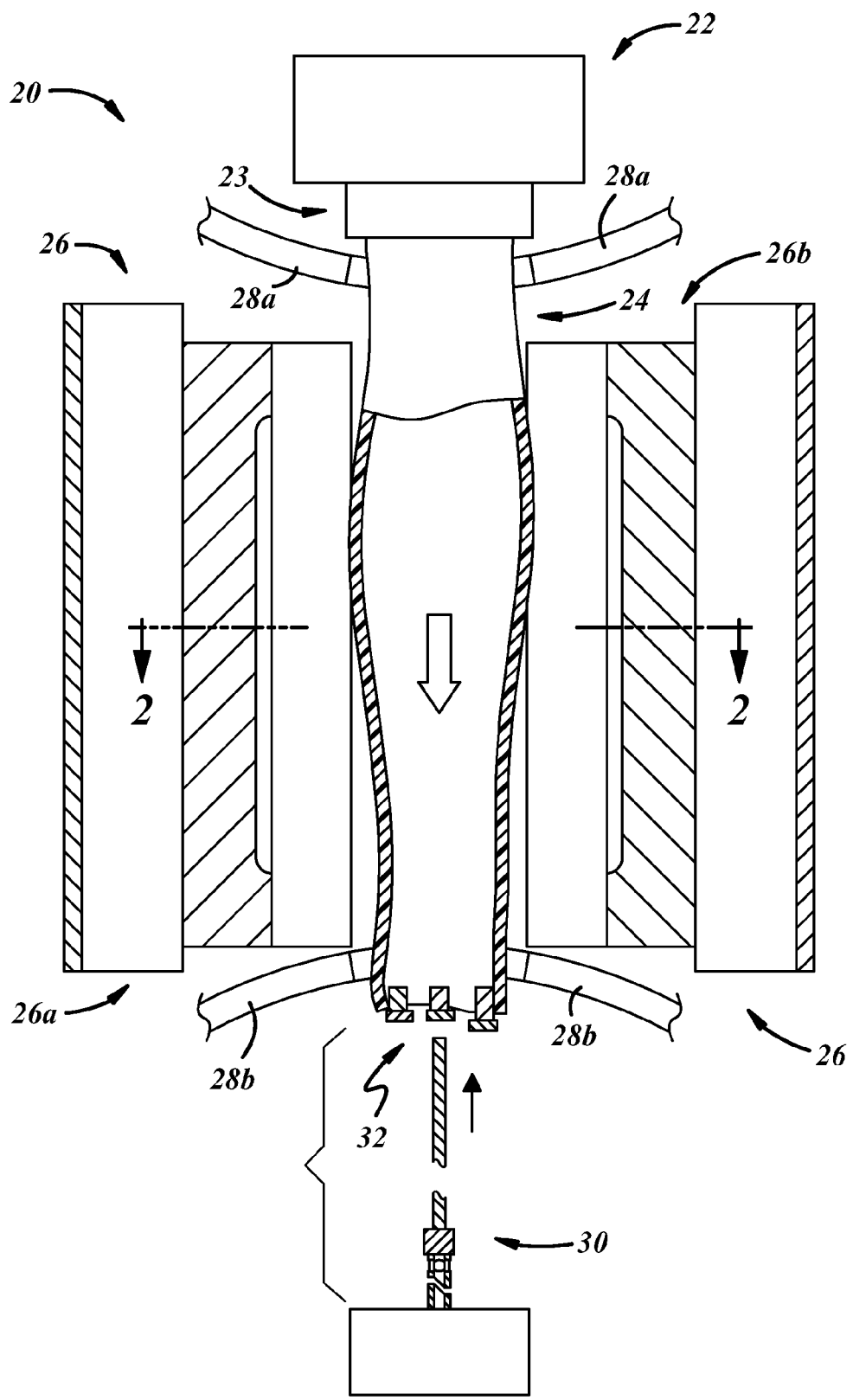
FIG. 1 is a longitudinal cross-sectional view of one exemplary implementation of a blow molding apparatus.

Referring in more detail to the drawings, FIG. 1 illustrates an exemplary implementation of a molding apparatus 20 that may be used to implement a presently disclosed method of manufacturing a mono-layer or multi-layer plastic product, for example, a plastic fuel tank, into which one or more components may be introduced during manufacturing of the product. The following apparatus description simply provides a brief overview of one exemplary apparatus, but other apparatuses not shown here could also support the presently disclosed method.

In general, the apparatus 20 may include an extruder 22 to produce a parison 24, and a mold 26 of a blow molding and/or deep drawing machine to form the parison 24 into a product, for example, a fuel tank (not shown) and including generally opposed mold halves 26a, 26b. As used herein, the term mold half may include a unitary component or a multiple-component assembly. In other words, each half 26a, 26b may include multiple mold components constituting a forming surface. The extruder 22 may be located directly over the mold 26 or may be laterally spaced apart from the mold 26 if desired. Also, a robot (not separately shown) may be positioned near the extruder 22 and the mold 26, and may include upper and/or lower grippers 28a, 28b to grip and transport the parison 24 from the extruder 22 to the mold 26. The grippers 28a, 28b may be vacuum grippers. The apparatus 20 further may include a blow pin 30 to introduce pressurized gas into the parison 24 and a spreader 32 to stretch the parison 24 radially outwardly. In general, extruders, molding and drawing machines, grippers, spreaders, and blow pins are all devices whose structure and function are well known to those of ordinary skill in the art and, thus, will not be discussed in detail here for the sake of focus on the present disclosure. One exemplary implementation of the presently disclosed method may be carried out using any suitable apparatus including, for example, the apparatus 20.

A parison may be produced in any known manner by extrusion or co-extrusion and the parison may be transported to a mold by grippers. For example, the extruder 22 may extrude the parison 24 and the upper and/or lower grippers 28a, 28b may transport the parison 24 to the mold 26. The parison 24 may be composed of a thermoplastic, for example, of high density polyethylene (HDPE), or polyester, or may be composed of duroplast. The parison 24 may be constructed with or without one or more barrier layers, for example, of ethylene-vinylalcohol-copolymer (EVOH), or polyamide, against diffusion of fuel vapors through the fuel tank to be formed. As used herein, the term "parison" may include a soft, hot, molding workpiece having at least one layer of plastic material extruded from an extrusion or co-extrusion machine. As used herein, the term "extruding" includes extrusion of a mono-layer parison or co-extrusion of a multi-layer parison.

Figure 2:
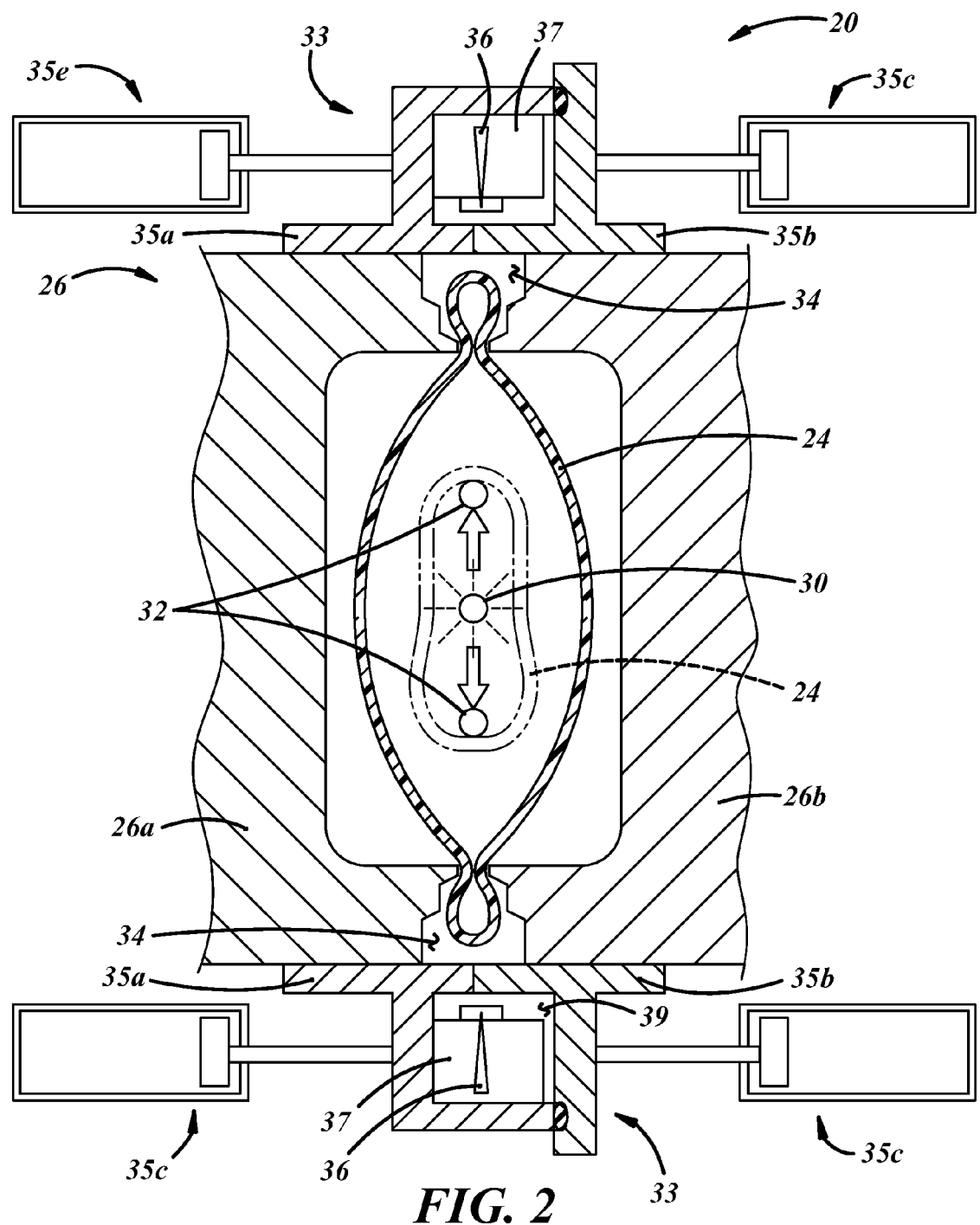
FIG. 2 is a cross-sectional view taken along line 2-2 of FIG. 1 illustrating in hidden lines an uninflated parison and illustrating in solid lines a partially inflated parison.

The extruded parison 24 may be introduced or positioned into the mold 26 and may be stretched or spread transversely with respect to the longitudinal axis of the parison 24 by the spreader 32 that may be inserted into the interior of the parison 24, as depicted in FIG. 2. For example, after the parison 24 has been placed inside the mold 26, the spreader 32 may be introduced from below into the parison 24. This spreader 32 may include a fixed center part and two or more lateral, movable spreading fingers. The spreading fingers are moved apart, which movement may pull the parison 24 into an elongated oval shape. The fixed center part, which may include the blow pin 30, may be used to prevent the central regions of the opposing wall portions of the parison 24 from coming into contact with each other and fusing together. The spreading fingers may remain in the parison 24 during the forming if desired. The material adjacent to the spreading fingers later may be separated from the formed tank and recycled if desired.

Figure 3:
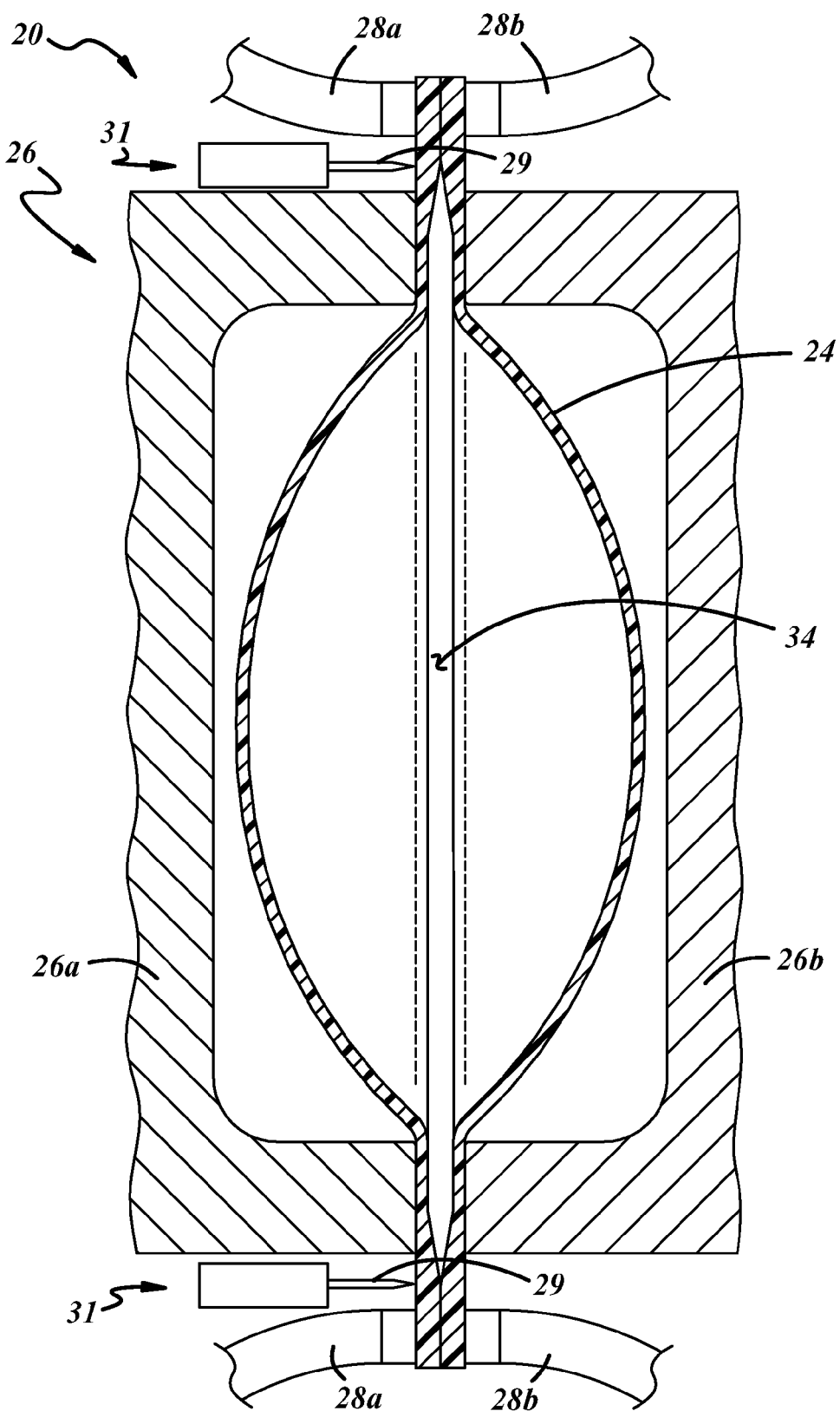
FIG. 3 is an enlarged fragmentary view of a portion of the blow molding apparatus of FIG. 1, illustrating upper and lower parison grippers pinching closed upper and lower portions of the parison.

Upper and lower portions of the parison 24 may be collapsed, for example, by squeezing or pinching those portions with pincers. For example, the pincers may be the grippers 28a, 28b themselves, as depicted in FIG. 3. In another implementation, the pincers may include other sets of grippers, arms, blades, or any other suitable apparatus that squeezes or pinches the parison portions. The collapsed portions of the parison 24 may define a sealed interior of the parison 24.

Also, as shown in FIG. 2, the parison 24 may be partially inflated, for example, by introducing pressurized gas into the sealed interior of the parison 24 via the blow pin 30 in the center part of the spreader 32. The parison 24 may be partially inflated to a fraction of its final volume, for example, approximately 20% to 40% of its final volume. Any suitable positive pressure may be used to partially inflate the parison 24, for example, about zero to three bar (0-43 PSI), or two to three bar according to a more specific implementation.

As also depicted in both of FIGS. 2 and 3, the mold 26 may be partially closed or moved toward a closed position but not fully closed so that gaps 34 of, for example, about 20 to 70 mm remains between the mold halves 26a, 26b before full closure of the mold 26. The mold 26 may be partially closed before, after, or during partial inflation of the parison 24 and in any suitable manner. For example, spacer blocks (not shown) may be advanced into positions between confronting portions of the mold halves 26a, 26b, molding machine platens (not shown), mold supports or mounts (not shown) between the mold halves 26a, 26b and the platens, or the like. Such arrangements provide a positive, hard stop to define the gaps 34. Any other suitable arrangement may be used to define the gaps 34, for example, hard stops integrated into mold machine closing devices (not shown), or "soft stops" programmed into a mold machine controller, or the like.

Still referring to FIG. 2, the apparatus 20 may include shields 33 carried outside of the mold 26 to prevent blow out of the parison 24 through the gaps 34 during partial inflation of the parison 24 when the mold 26 is only partially closed. For example, the shields 33 may include opposed panels or plates 35a, 35b slidably carried along sides of the mold halves 26a, 26b. The opposed plates 35a, 35b may be advanced and retracted with respect to one another, for example, by actuators 35c. The plates 35a, 35b may be advanced into interengagement or abutment with one another to close off the gaps 34. Any suitable actuators 35c may be used, for example, hydraulic, pneumatic, or electromechanical actuators. As shown in FIG. 2, the shields 33 may be positioned along longitudinal sides of the mold 26, but other shields may also be positioned adjacent the top and/or bottom of the mold 26 for the same or similar purpose.

Referring to FIG. 3, the apparatus 20 also may include upper and/or lower cutters 29 to remove upper and/or lower portions of the parison 24. The cutters 29 may include, for example, blades, knives, lasers, and/or heated wires, or any other suitable cutters. Also, any suitable actuators 31 may be provided to advance and retract the cutters 29, for example, hydraulic, pneumatic, or electromechanical actuators. The upper and/or lower portions of the parison 24 may be removed at any suitable time, for example, during or after forming of the parison 24 into an initially formed product 50 (FIG. 4).

Figure 4:
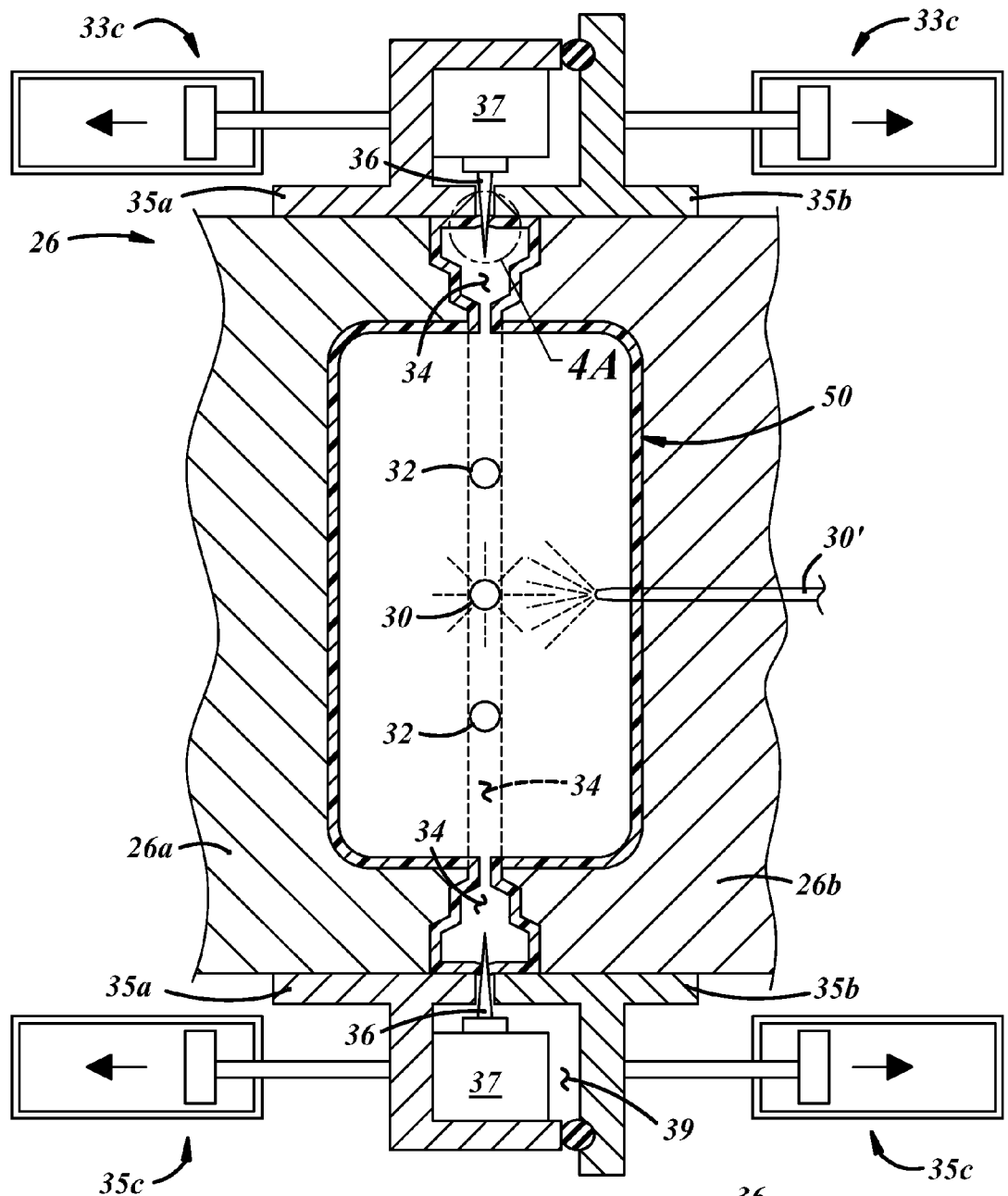
FIG. 4 is a cross-sectional view of the blow molding apparatus of FIG. 1 illustrating a fully inflated parison, a blow needle, and parison cutters used to cut the parison in two halves.

For instance, as shown in FIG. 4, the partially inflated parison 24 (FIGS. 2 and 3) may be further formed in the mold 26, for example, by further introducing pressurized gas via the blow pin 30, or blow needle 30' or both, into the interior of the parison 24, and/or by applying a vacuum on an exterior of the parison 24, for example, via vacuum passages (not shown) in mold halves 26a, 26b. In one implementation, the parison 24 may be inflated with a pressure of, for example, about 3 bar (43 PSI) by the blow pin 30, and the blow needle(s) 30' may be pushed laterally through a wall of the partially inflated parison 24 through one of the blow mold halves 26a, 26b, and the interior of the inflated parison 24 may be further inflated with an additional pressure of, for example, about 1.5 bar (21-22 PSI). Any suitable pressures, for example, 3 to 10 bar (43-145 PSI) may be applied until the mold halves 26a, 26b are form-fittingly filled out by the parison 24. This pressure may be held for a suitable amount of time, for example, about 15 to 25 seconds, at least initially to produce the initially formed product 50 but to avoid overcooling the initially formed product 50 so that its interior surfaces remain hot and sticky. In one example, two blow needles 30' may be used.

Referring again to FIG. 4, the initially formed product 50 may be cut in the gaps 34 between the mold halves 26a, 26b. For example, remnants of the inflated parison 24 or parts of the initially formed product 50 that protrude outboard of a pinch line of the mold 26 may be cut by cutters 36, for example, blades, knives, lasers, and/or heated wires, or any other suitable cutters. Any suitable actuators 37 may be used to move the cutters 36 along the mold 26 and between the plates 35a, 35b of the shields 33. Accordingly, the shield plates 35a, 35b may be retracted to allow the cutters 36 to enter the gaps 34 between the mold halves. In another embodiment, the plates 35a, 35b may be advanced as close as possible while still allowing cutters 36 to at least partially protrude therebetween. In this latter embodiment, a sealed chamber 39 may be defined between opposing halves of the shields 33 and pressurized gas may be provided in the chamber 39 to prevent the parison 24 from blowing through between the plates 35a, 35b. In any event, the proximity of confronting portions of the advanced plates 35a, 35b may be sufficient to inhibit the parison 24 from being blown therethrough. The cutting operation may be performed after partial inflation of the parison 24 but before full inflation, or during or after the time the pressure is held during forming of the initially formed product 50. In other words, the cutting operation may be carried out at any suitable point in the process.

Figure 5:
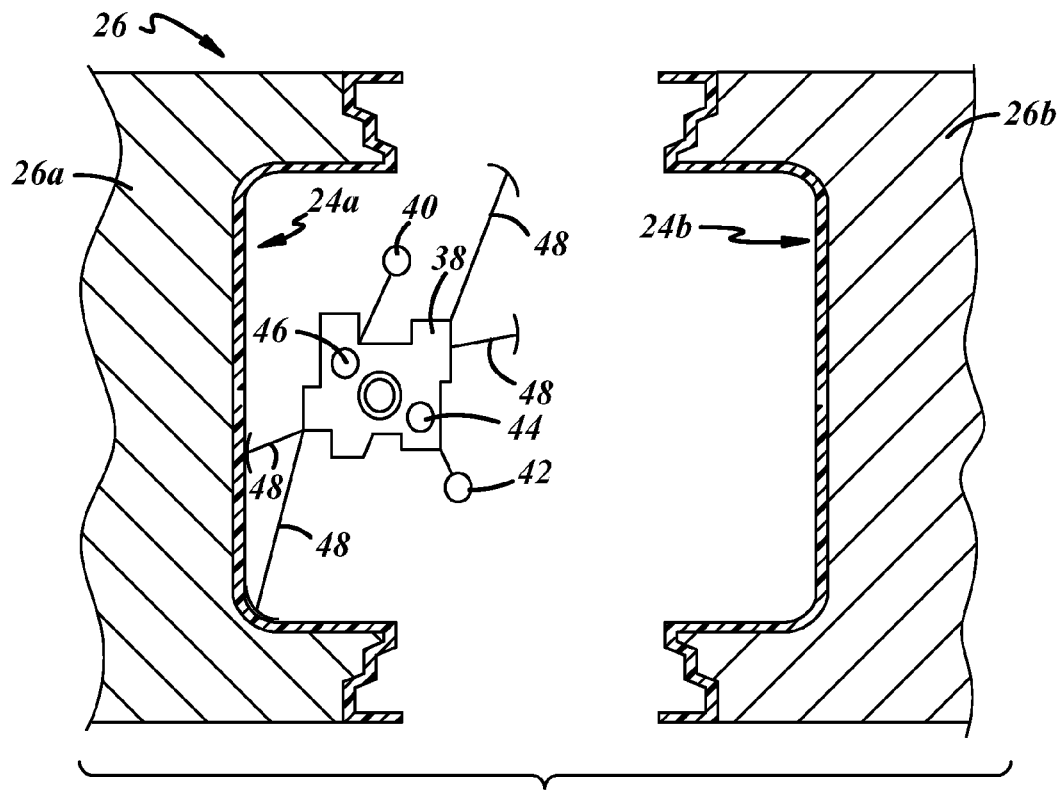
FIG. 5 is a cross-sectional view of the blow molding apparatus of FIG. 1 illustrating fuel system components and a carrier being positioned between open mold halves.

As shown in FIG. 5, the mold 26 may be opened wherein halves 24a, 24b of the inflated parison 24 remain in their corresponding mold half 26a, 26b. In one example, the halves 24a, 24b may be held in the mold 26 by the grippers (not shown). In another example, the halves 24a, 24b may be held in the mold 26 by undercuts or channels or pins (not shown) around the halves 24a, 24b. In a further example, the halves 24a, 24b may be held in the mold 26 by vacuum applied through vacuum holes (not shown) provided in and around the mold halves 26a, 26b.

In general, components may be introduced into the mold 26 for location within a finished molded product. For example, one or more components 40, 42, 44, 46 may be collectively disposed on a carrier 38 and are introduced into the mold 26 and connected to one parison half 24a, 24b and/or the other. For example, using a robot and grippers (not shown), one or more components may be placed in contact with an inside surface or wall of one or both parison halves 24a, 24b, such that the component(s) attach to the wall. In another example, the component(s) may be loosely located such that they are not attached to wall(s) of the halves 24a, 24b. Such components may include a fuel level sensor, venting devices, a fuel pump, and a fuel filter, where a plurality of the components may be pre-mounted on the common carrier 38, as well as bracing elements 48, which may reach to spaced apart regions of the fuel tank, for example, one or more corner regions. An example common carrier of this type is disclosed in U.S. patent application Ser. No. 12/562,266 filed on Sep. 18, 2009 and entitled FUEL TANK SUPPORT, which is assigned to the assignee hereof and is incorporated herein by reference in its entirety. After the one or more components have been secured to the inside of the fuel tank, the robot may be moved away from the mold 26.

Figure 6:
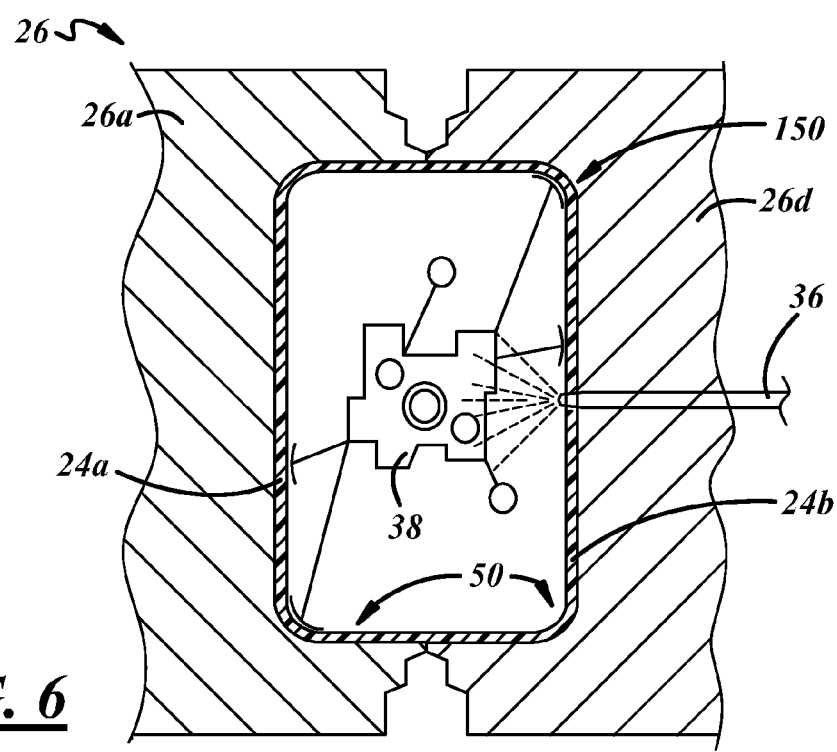
FIG. 6 is a transverse cross-sectional view of the blow molding apparatus shown in FIG. 5 illustrating the mold halves closed together around the fuel system components and the carrier.

As shown in FIG. 6, the mold 26 may be closed so that the still-hot parison halves 24a, 24b are fused to each other along their corresponding margins or edges along the pinch line to define a molded product 150. If needed, a heater (not shown) may be used to enhance fusion of such margins or edges.

The interior of the molded product 150 may be pressurized by way of the blow needle(s) 30' to create the final shape of and/or suitably cool the molded product 150. For example, the product 150 may be pressurized to within about 6 to 20 bar (86-290 PSI) or, more specifically, about 8 to 10 bar (115-145 PSI). The interior of the product 150 then may be vented and the blow needle(s) 30' retracted.

Figure 6A:
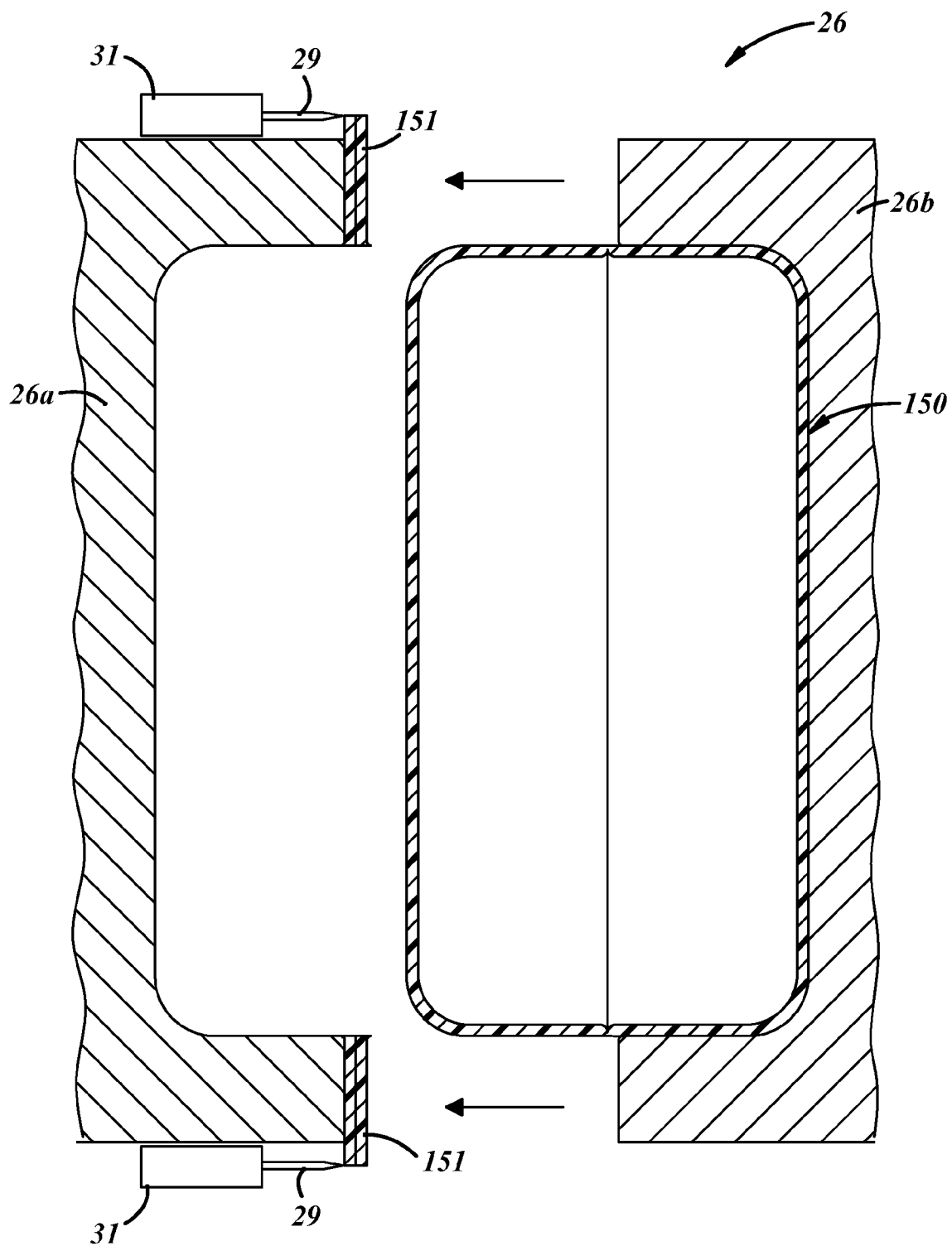
FIG. 6A is a longitudinal cross-sectional view of the apparatus of FIG. 1 illustrating mold halves being separated to open a mold and deflash a molded product.

Then the mold 26 may be opened, and the molded product 150 may be removed from the mold 26, and the molded product 150 may be simultaneously or immediately subsequently deflashed of its flash 151 and passed on to a downstream destination. For example, the tank 150 may be automatically deflashed as shown in FIG. 6A by any suitable in-mold deflashing arrangement. Accordingly, the cutters 29 and/or 36 in conjunction with in-mold deflashing may provide a finished product that does not require further deflashing.

Referring generally to FIGS. 7 through 11, another exemplary implementation of the presently disclosed method may be carried out using any suitable apparatus and is disclosed herein as being carried out in conjunction with one exemplary apparatus 220. This implementation is similar in many respects to that of FIGS. 1 through 6 and like numerals between the implementations generally designate like or corresponding elements throughout the several views of the drawing figures. Accordingly, the foregoing description is incorporated into the following description by reference in its entirety, and vice-versa. Additionally, the description of the common subject matter generally may not be repeated here.

Figure 7:
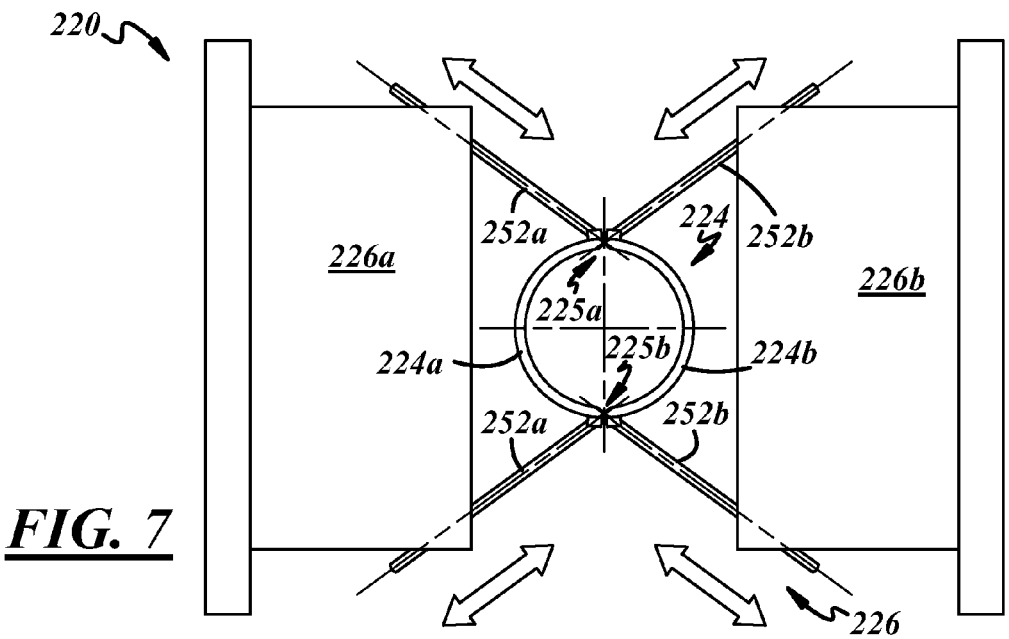
FIG. 7 is a top view of another exemplary implementation of a blow molding apparatus, illustrating an extruded parison and grippers holding the parison.
Figure 8:
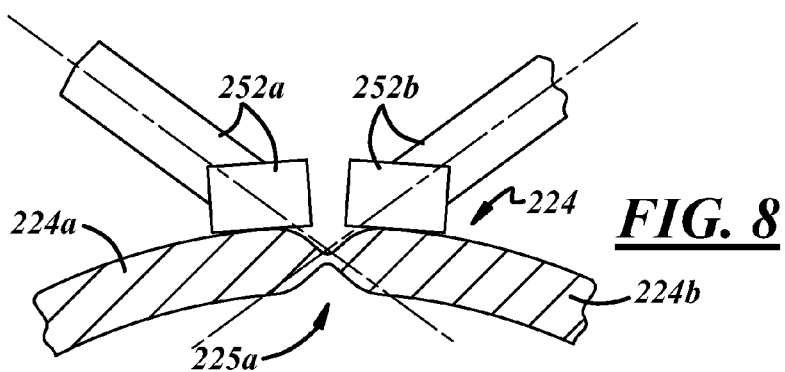
FIG. 8 is an enlarged view of a portion of the apparatus of FIG. 7.

As shown in FIGS. 7 and 8, a parison 224 may be produced by extrusion or co-extrusion to produce two longitudinally extending weakened portions 225a, 225b that may be diametrically opposed. In one implementation, the weakened portions include notches or thinned wall portions that may extend longitudinally along the full length of the parison 224. As best shown in FIG. 8, the weakened portions 225a, 225b may be formed along an interior surface, an exterior surface, or both. For example, referring to FIG. 1, the extruder 22 may include a nozzle 23 having male-shaped extrusion features (not shown) corresponding to the female-shaped weakened portions 225a, 225b (FIG. 8). In another example of this implementation, male-shaped extrusion features may be located downstream of the nozzle 23, for example, on a ring mounted to the nozzle 23. In another implementation, not shown, the weakened portions may be longitudinally extending perforations that may be produced by spoked wheels at the extruder nozzle 23. In a further implementation, not shown, the weakened portions may be longitudinally extending partial cuts that do not pierce through the wall of the parison 224. Such partial cuts may be produced by rotary knives, like pizza cutters, at the extruder nozzle 23.

In any case, the parison 224 then may be transported to the open mold 226 of FIG. 7, by the transport grippers 28a, 28b of FIG. 1. But before the transport grippers 28a, 28b (FIG. 1) disengage the parison 224, as shown in FIGS. 7 and 8, opposed sets of grippers 252a, 252b disposed at the mold 226 may be advanced to engage the parison 224 adjacent to the weakened portions 225a, 225b on opposed sides of the weakened portions 225a, 225b. The grippers 252a, 252b may be vacuum grippers, or any other suitable types of grippers. The parison 224 may be introduced into the open mold 226 and positioned between the open mold halves 226a, 226b by the opposed sets of grippers 252a, 252b.

The opposed sets of grippers 252a, 252b may be retracted or pulled away from one another, to split or tear the parison 224 apart along the weakened portions 225a, 225b so that, for example, one half 224a of the split parison may be held by at least one set of the grippers 252a and an other half 224b may be held by at least one opposed set of the grippers 252b. Any suitable quantity, size, and configuration of grippers may be used. As used herein, the term grippers includes any components to hold the parison 224 to a sufficient degree to allow separating the parison halves 224a, 224b from the whole parison 224.

Figure 9:
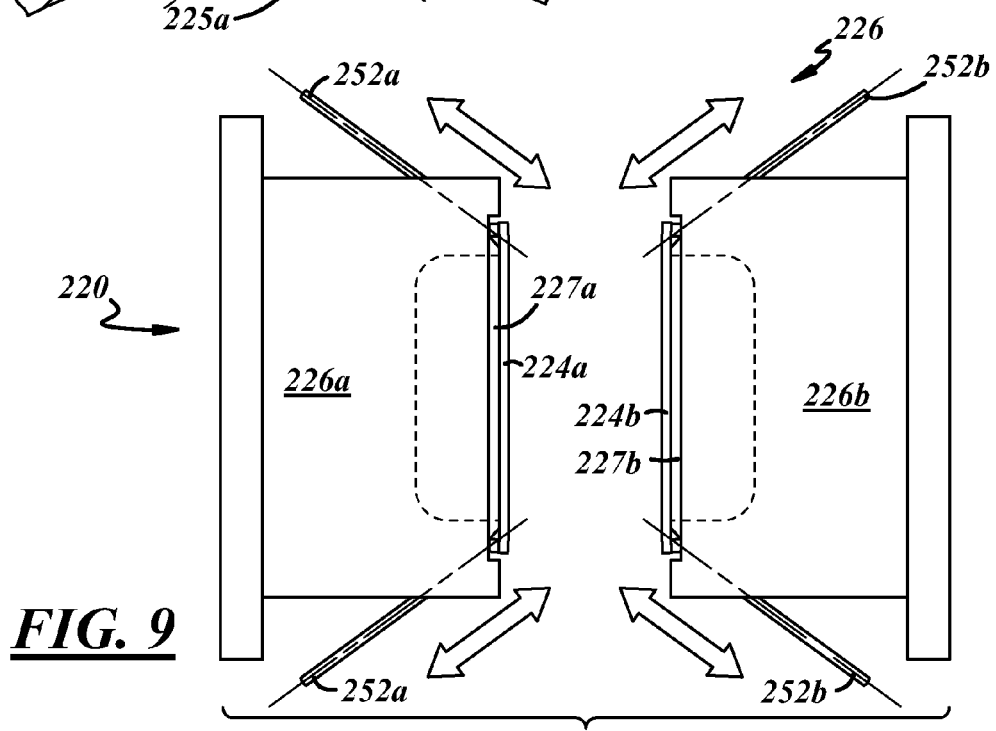
FIG. 9 is a top view of the apparatus of FIG. 7, illustrating the parison divided into halves and pulled toward corresponding mold halves by the grippers.
Figure 10:
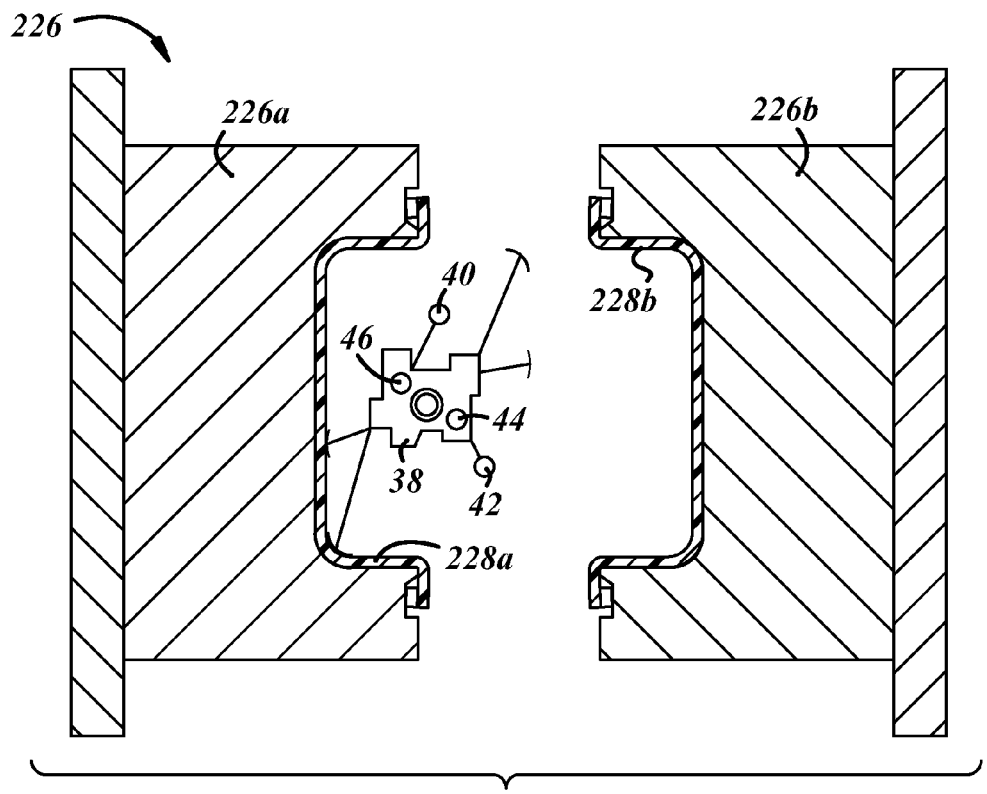
FIG. 10 is a cross-sectional view of the apparatus shown in FIG. 9, illustrating the divided parison formed into contact with the mold halves.

Referring to FIG. 9, split parison halves 224a, 224b are positioned against the mold halves 226a, 226b to create a sealing fit of outer portions of the parison halves 224a, 224b on corresponding outer portions of the mold halves 226a, 226b. For example, the grippers 252a, 252b may continue to retract and may otherwise be moved to position the parison halves 224a, 224b against open faces of the mold halves 226a, 226b. As shown in FIG. 10, spaces 227a, 227b between the parison halves 224a, 224b and the mold halves 226a, 226b may then be evacuated to draw or vacuum form two tank halves 228a, 228b against recessed surfaces of the mold halves 226a, 226b.

Figure 11:
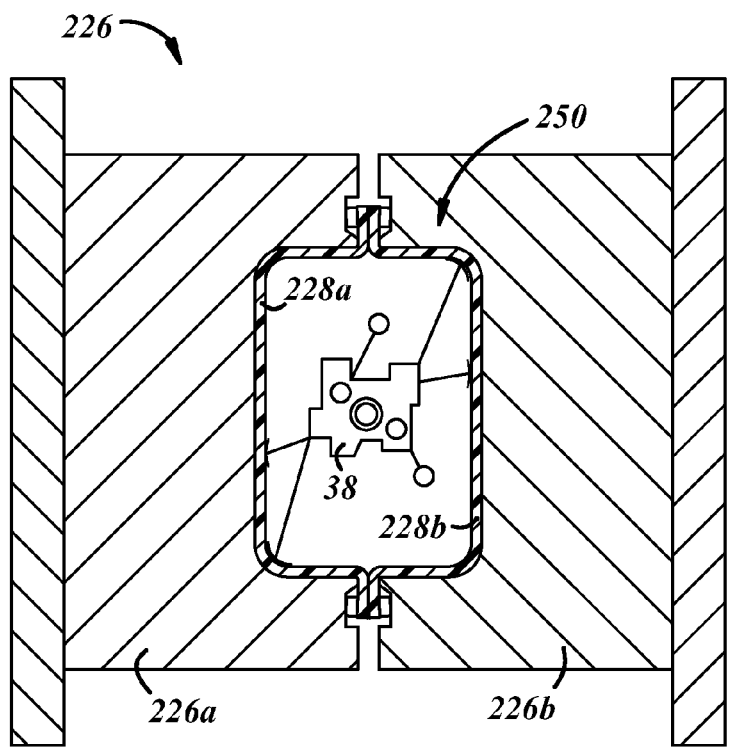
FIG. 11 is a cross-sectional view of the apparatus shown in FIG. 10, illustrating mold halves closed together to bond the parison halves to one another.

One or more individual components or a plurality of components 40-46 collectively disposed on a carrier 38 may be introduced into the mold 226 and connected to one or both of the now-formed tank halves 228a, 228b. As shown in FIG. 11, the mold 226 may then be closed so as to fuse the tank halves 228a, 228b to each other along their corresponding edges with the components and/or carrier maintained between the tank halves. The mold 226 may be opened and a molded tank 250 may be removed.

Referring generally to FIGS. 12 through 16, a further exemplary implementation of the presently disclosed method may be carried out using any suitable apparatus and, more specifically, may be carried out in conjunction with an apparatus 320 and with the other two method implementations described above. This implementation is similar in many respects to those of FIGS. 1 through 11 and like numerals between the implementations generally designate like or corresponding elements throughout the several views of the drawing figures. Accordingly, the foregoing descriptions are incorporated into the following description by reference in their entireties. Additionally, the description of the common subject matter generally may not be repeated here.

Figure 12:
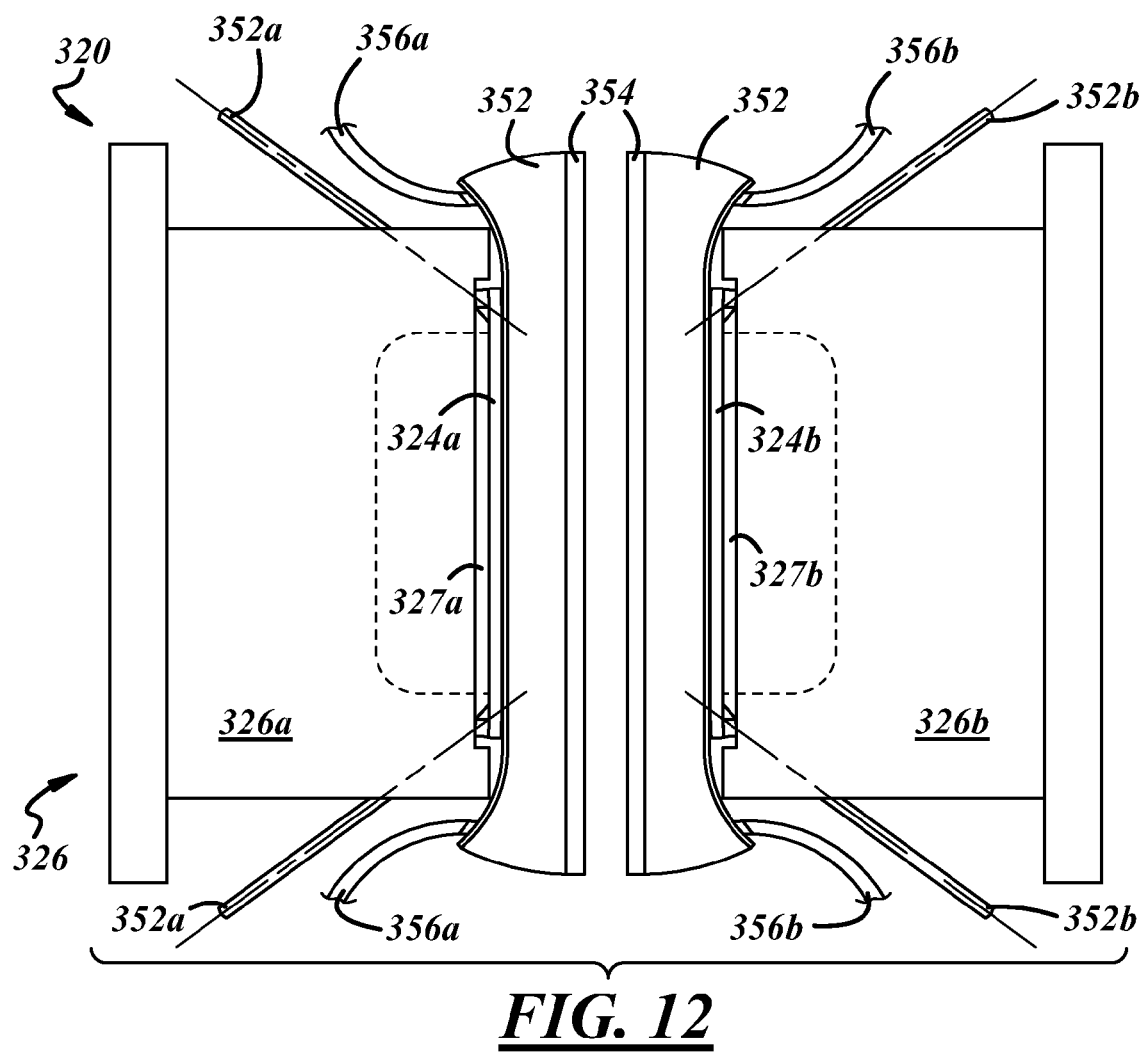
FIG. 12 is a top view of another exemplary implementation of a blow molding apparatus, illustrating separated halves of an extruded parison and additional sets of grippers positioning film of material between mold halves.

First, as depicted in FIG. 12, film 352 may be positioned in an open mold 326 between mold halves 326a, 326b. According to an example, the film 352 may include sheets of film, sprayed film, film coatings, or the like. For example, rolls 354 of the film 352 may be positioned above or at an upper end of the mold halves 326a, 326b, and opposed sets of film grippers 356a, 356b may grip corresponding portions of the film 352 from the film rolls 354 and pull the film 352 downward to a position at or below a lower end of the mold halves 326a, 326b so as to position the film 352 in front of each open mold half 326a, 326b.

Figure 13:
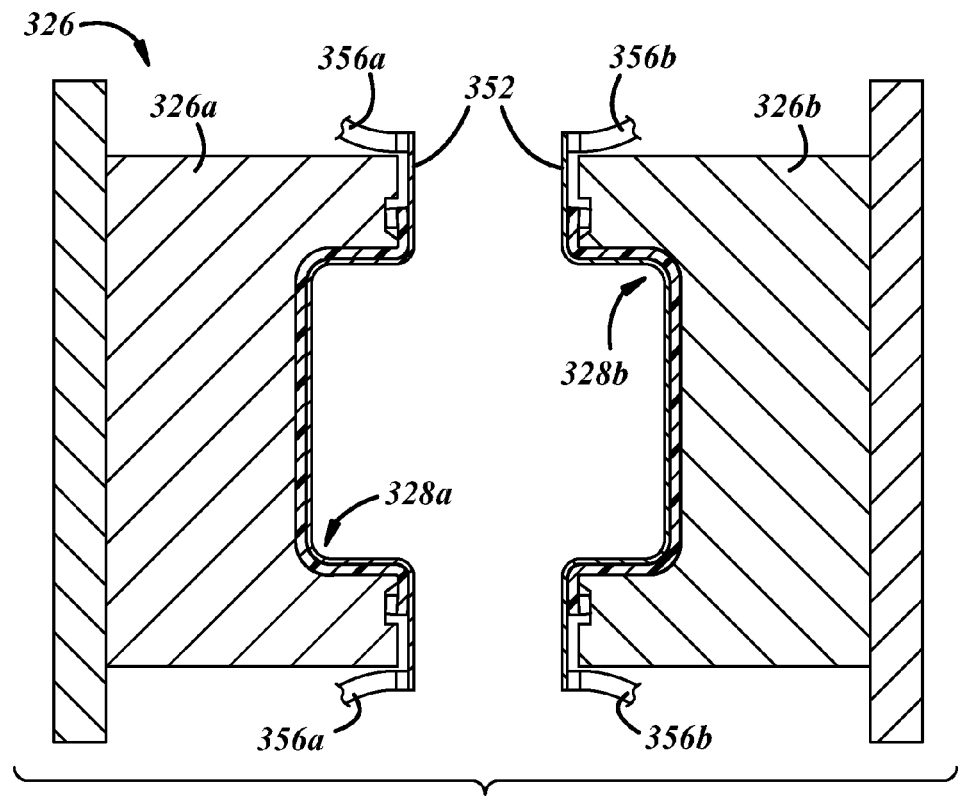
FIG. 13 is a cross-sectional view of the apparatus shown in FIG. 12, illustrating the separated parison halves formed into contact with the mold halves and corresponding film formed into contact with the parison halves on interior sides of the parison halves.
Figure 14:
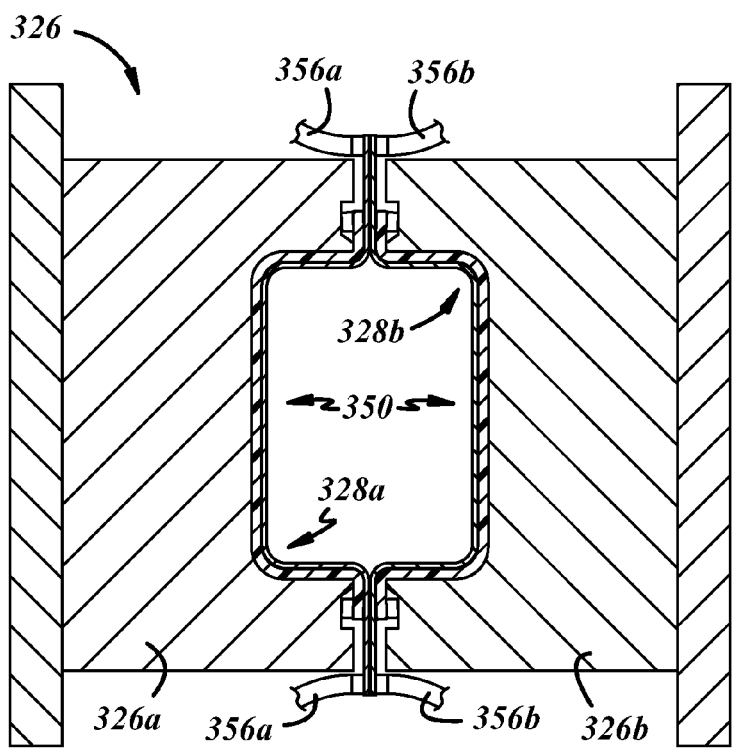
FIG. 14 is a cross-sectional view of the apparatus shown in FIG. 13, illustrating the mold halves closed together to bond the film to one another.

In one embodiment, as shown in FIG. 12, the film 352 may be located inwardly of separated parison halves 324a, 324b, and positioned or placed against inside surfaces of the parison halves 324a, 324b. The parison halves 324a, 324b may be separated from one another in any suitable manner, for example, including cutting or tearing. Then, spaces 327a, 327b between the parison halves 324a, 324b and the mold halves 326a, 326b are evacuated to draw or vacuum form two tank halves 328a, 328b against recessed surfaces of the mold halves 326a, 326b, as shown in FIG. 13. Thereafter, the mold 320 may be closed so as to fuse the now formed tank halves 328a, 328b to each other along their corresponding edges to form a fuel tank 350, as shown in FIG. 14. As a variation on this embodiment, film instead may be coatings that may be sprayed against inside surfaces of the parison halves 324a, 324b. As used herein, the term "applying" includes, for example, placement or spraying. An exemplary spray may include any suitable poly-vinyl-alcohol, polyamide, or the like. In another embodiment, the formed tank halves 328a, 328b, with or without the film, may be treated with fluoro-gas in a fluorinating chemical reaction to provide a barrier or resistance to permeation.

Figure 4A:
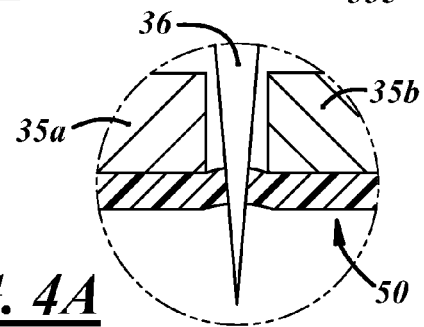
FIG. 4A is an enlarged fragmentary view of a portion of the apparatus illustrated in FIG. 4.
Figure 15:
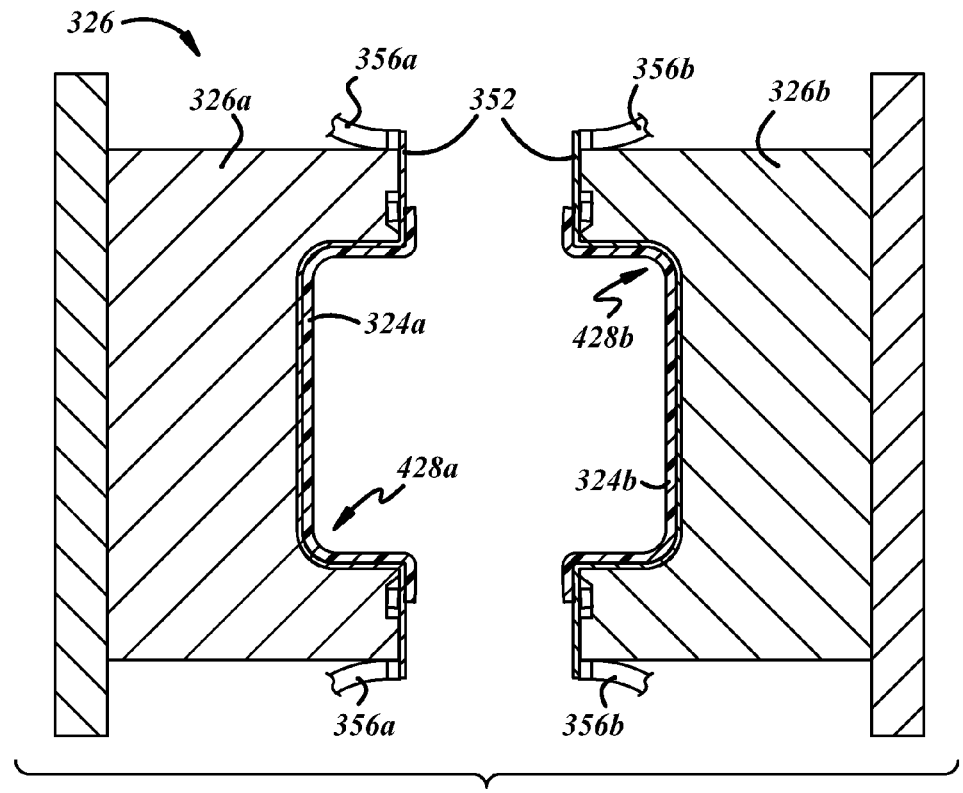
FIG. 15 is a cross-sectional view of a configuration alternative to that shown in FIG. 13, illustrating film formed into contact with the mold halves on mold sides of the parison halves.
Figure 16:
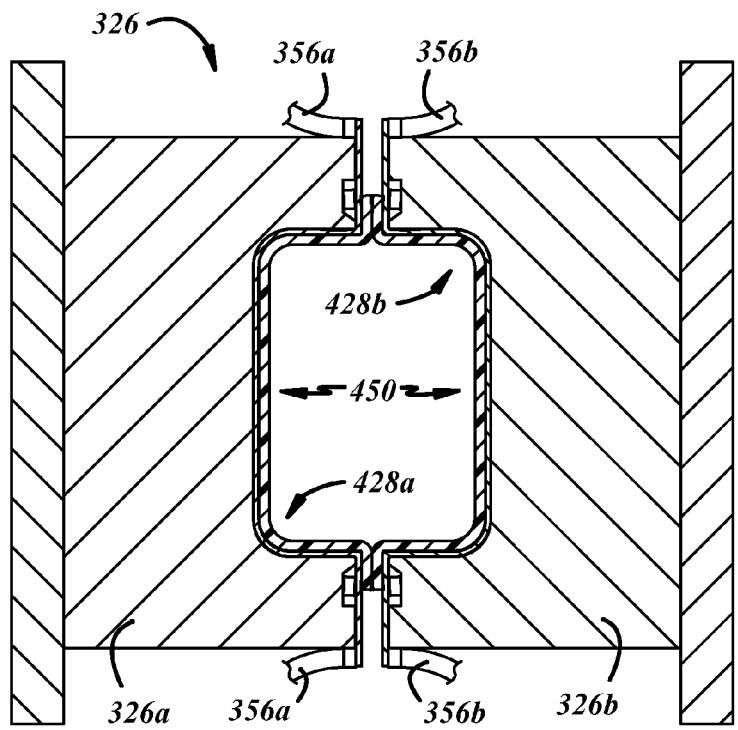
FIG. 16 is a cross-sectional view of the apparatus shown in FIG. 15, illustrating the mold halves closed together to bond the parison halves to one another.

In another embodiment, depicted in FIG. 15, film may be placed against mold halves 326a, 326b, and according to one aspect of this embodiment, separated parison halves 324a, 324b then may be placed against inside surfaces of the film 352. According to a different, not illustrated, aspect of this embodiment, a parison may be expanded into contact with film in a partially open mold and subsequently cut along gaps between mold halves as previously described with respect to FIGS. 4 and 4A. As shown in FIG. 15, spaces between the film 352 and the mold halves are evacuated to draw or vacuum form two tank halves 428a, 428b against recessed surfaces of the mold halves 326a, 326b, as shown in FIG. 15. Subsequently, the mold 326 may be closed so as to fuse the now formed tank halves 428a, 428b to each other along their corresponding edges to form a fuel tank 450, as shown in FIG. 16.

Figure 17:
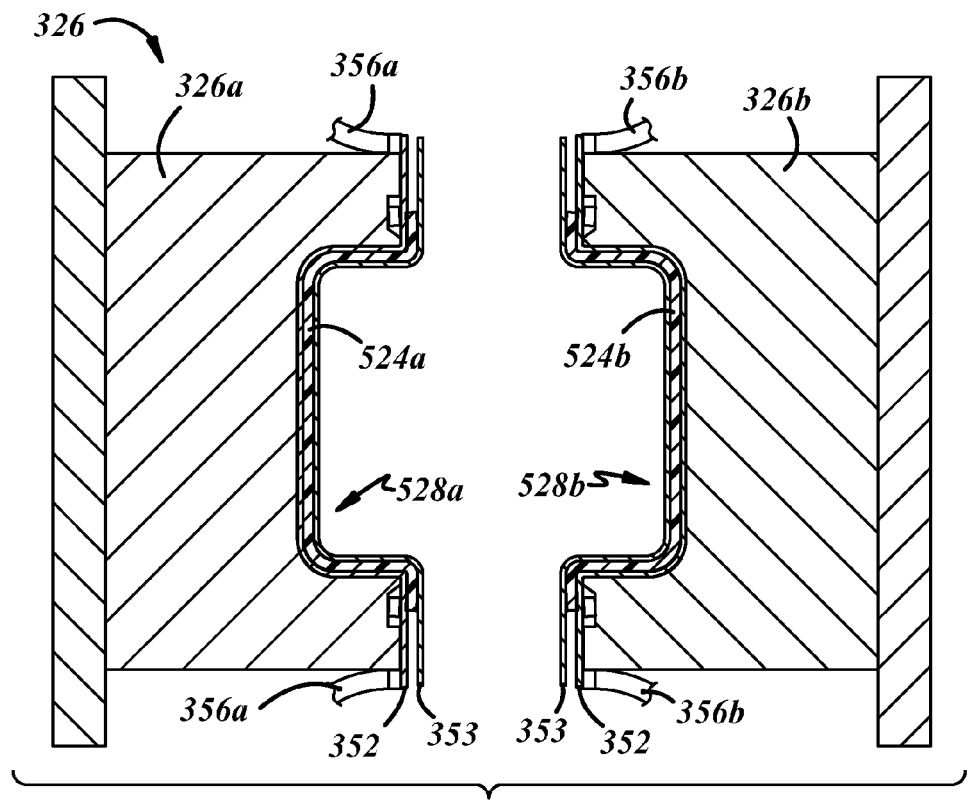
FIG. 17 is a cross-sectional view of a configuration alternative to that shown in FIG. 13, illustrating exterior film formed into contact with the parison halves on interior sides of the parison halves and interior film formed into contact with the mold halves on mold sides of the parison halves.
Figure 18:
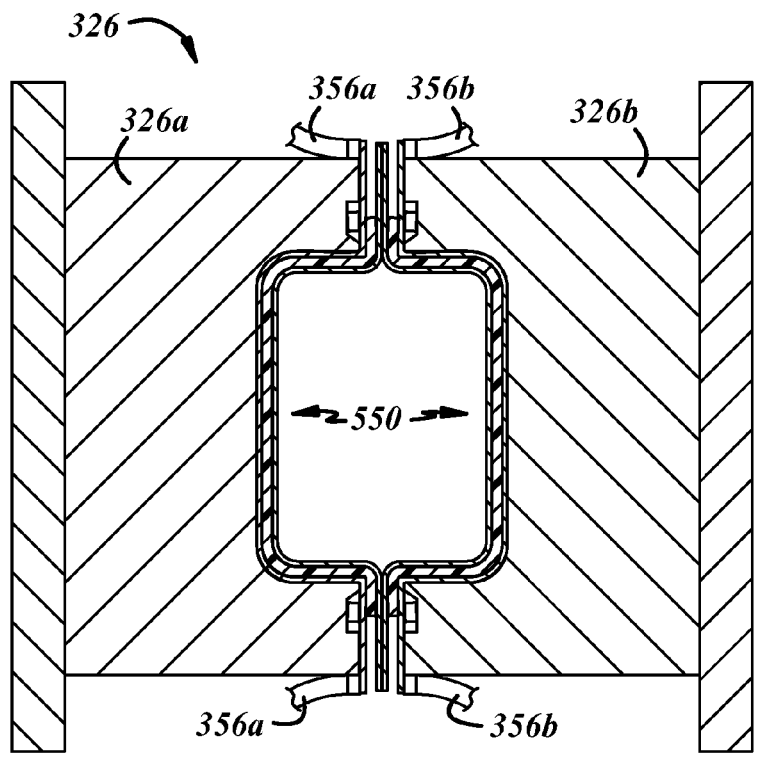
FIG. 18 is a cross-sectional view of the apparatus shown in FIG. 15, illustrating the mold halves closed together to bond the interior film to one another.

In a further embodiment depicted in FIG. 17, films 352, 353 may be placed both inward and outward of parison halves 524a, 524b. For example, a first set of film 352 may be placed against the mold halves 326a, 326b, then the parison halves 524a, 524b placed adjacent the first set of film 352, and thereafter a second set of film 353 may be placed against inside surfaces of the parison halves 524a, 524b so as to sandwich the parison halves 524a, 524b between two sets of films 352, 353. Subsequently, the mold 326 may be closed so as to fuse now formed tank halves 528a, 528b to each other along their corresponding edges to form a fuel tank 550, as shown in FIG. 18. In this embodiment, the first and second sets of films may have different structural layer configurations and/or may be composed of different materials. Various film configurations and materials are discussed below.

The film may be provided in any suitable quantity of layers and configurations including one or more of adhesive layers (a), barrier layers (b), and/or structural layers (c). In one embodiment, the film may be a five or more layer film having the following basic configuration: c/a/b/a/c. In another embodiment, the film may be a three or more layer film having the following basic configuration: a/b/a. In a further embodiment, the film may be a two or more layer film having the following basic configuration: a/b, wherein layer a may be oriented for contact with its corresponding parison half. The film may have any suitable number of layers and may include additional layers not described here.

In one exemplary embodiment, the films 352, 353 may include multiple layer films including the adhesive layer (a) that may be oriented for contact with a corresponding one of two tank halves so that the relatively hot tank halves at least partially melt the adhesive layer for good fusion of the films to the tank halves. An exemplary resin for the adhesive layer may include maleic anhydride grafted linear low density polyethylene.

Also, the multiple layer film may include the barrier layer (b) that may or may not be melted by the heat from the tank halves so as to preserve the structural integrity of the film. An exemplary resin for the barrier layer may include ethylene-vinylalcohol-copolymer (EVOH), polyoxymethylenes (POM), thermoplastic polyester elastomers (TPEs) that may include HYTREL brand TPE available from DuPont of Delaware or any other suitable TPE. Another exemplary barrier layer resin may include any of a number of polyamide (PA) based materials, for example, PA 12, PA 6/6-6 copolymers with a melting point of 195° C. to 200° C. or PA 6, with a melting point of 220° C. to 225° C. Another PA material may include MXD6, which is a semi-aromatic PA that is available, for example, from Solvay Advanced Polymers or Mitsubishi Gas Chemicals. A further PA material may include a PA and polyethylene blend, like a mixture, or alloy, for example, ORGALLOY brand polymer available from Arkema, or possibly a ZYTEL brand polymer available from DuPont. In another embodiment, the barrier layer may include any suitable nanocomposite material, for instance, nanoclay material or nanotube material, to improve barrier performance. In a further embodiment, the barrier layer may be a combination of EVOH and ORGALLOY® FT-104 available from Arkema.

Further, the multiple layer film may include the structural layer (c) to enhance structural integrity of the film. An exemplary resin for the structural layer may be of the same composition as the extruded parison, for example, HDPE. Another exemplary resin for the inner structural layer may include PE, PA, or any other polymer, and their electrically conductive versions, which may be obtained, for example, by compounding their base resin with electrically conductive fillers or nanotubes for instance. Also, the structural layer and/or one or more of the other layers may be provided as virgin or reground material from production.

In one embodiment, the structural layer (c) may not be a conductive layer and, instead may be composed of, for instance, HDPE, and a separate conductive material could be present in the form of a thin inner layer.

In another embodiment of the structural layer (c) of a multi-layer film, the structural layer may be composed of a material that does not bond to the material of the parison halves so as to leave a space between the structural layers and the parison halves. In this embodiment, the film may be fused or otherwise welded onto itself at pinch lines of the formed fuel tank. For example, heated mold inserts (not shown) may be used to raise the temperature of the material at the pinch lines so as to fuse the film together. In this case in particular, electrically conductive polymers may be desirable if the heated mold inserts are induction type heaters.

In another embodiment related to the preceding paragraph, the film could be provided as a single layer film including just the barrier layer. In this embodiment, the barrier layer may be arranged so as to leave a space between the barrier layer and the parison halves. In this embodiment, the barrier monolayer film may be fused or otherwise welded onto itself at pinch lines of the formed fuel tank. For example, heated mold inserts (not shown) may be used to raise the temperature of the material at the pinch lines so as to fuse the film together. In this case in particular, electrically conductive polymers may be desirable if the heated mold inserts are induction type heaters.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. For example, although described with respect to a fuel tank, the presently disclosed methods and apparatuses may be used with any other suitable receptacles of any kind. The invention is defined by the following claims.

What is claimed is:

1. A method of manufacturing a product, comprising:
   extruding a heated annular plastic parison to include longitudinally weakened portions;
   before molding and without placing the parison in a mold, gripping the parison with opposed grippers other than a mold on opposed sides of the weakened portions and retracting the opposed grippers to cause the grippers to pull on the parison and tear the parison apart between the opposed grippers to separate the parison into separate parison halves;
   disposing the separate parison halves between opposed open mold halves;
   displacing the separate parison halves into the mold halves to at least partially form product halves;
   introducing at least one component between the product halves; and
   closing the mold halves together around the at least one component to fuse the product halves together along corresponding edges of the product halves.

2. The method of claim 1, further comprising:
   with the opposed grippers, positioning the separate parison halves against the corresponding open mold halves, and
   evacuating spaces between the parison halves and the mold halves to vacuum form the parison halves into the product halves.

3. The method of claim 2 wherein the longitudinally weakened portions include notches or thin wall sections or partial cuts in the parison arranged so that the parison is not completely separated into halves until acted upon by the grippers.

4. The method of claim 1, further comprising applying a film against at least one of the parison halves or the mold halves.

5. A method of manufacturing a product, comprising:
- extruding an annular heated plastic parison to include longitudinally weakened portions;
- before molding, gripping the parison with opposed grippers other than a mold on opposed sides of the weakened portions;
- before the parison is placed into a mold for forming the parison into a product, retracting the opposed grippers to cause the grippers to pull on the parison and tear the parison apart between the opposed grippers and along the weakend portions to separate the parison into parison halves;
- with the opposed grippers, positioning the separate parison halves in a mold against corresponding open halves of the mold;
- displacing the parison halves into and against the mold halves;
- introducing one or more components between the separate parison halves while in the mold halves; and
- closing the mold halves together so that the parison halves fuse to each other along corresponding edges and at least part of said one or more components are connected to the formed product.

6. The method of claim 5, further comprising applying a film against at least one of the parison halves or the mold halves.

7. The method of claim 5, further comprising applying a film against at least one of the parison halves or the mold halves, and forming the film and parison halves against the mold halves to produce multi-layer product halves.

8. The method of claim 5, further comprising introducing pressurized gas into the interior of the fused parison halves in the closed mold halves to form the product.

9. The method of claim 5, further comprising introducing gas at a pressure of at least three bars into the interior of the fused parison halves in the closed mold halves to form the product.

10. The method of claim 5, further comprising before retracting the opposed grippers to tear the parison apart, partially inflating the parison to increase the internal volume of the parison.

* * * * *